Figure 1:
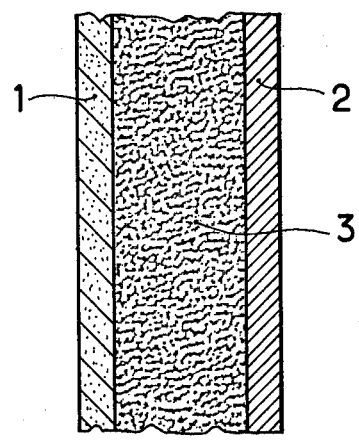

United States Patent [19]
Feuillade

[11] 4,086,402
[45] Apr. 25, 1978

[54] LITHIUM ELECTRIC CELL

[75] Inventor: Georges Feuillade, Arpajon, France

[73] Assignee: Compagnie Generale d'Electricite S.A., Paris Cedex, France

[21] Appl. No.: 777,801

[22] Filed: Mar. 15, 1977

[30] Foreign Application Priority Data

Mar. 19, 1976 France .................................. 76 0805

[51] Int. Cl.$^2$ ............................................. H01M 6/14
[52] U.S. Cl. ..................... 429/190; 429/197; 429/199; 429/219; 429/220
[58] Field of Search ................................ 429/194–198, 429/190, 199, 218, 219, 220

[56] References Cited

U.S. PATENT DOCUMENTS

| | | | |
|---|---|---|---|
| 3,531,328 | 9/1970 | Bro et al. ........................ | 429/194 X |
| 3,658,593 | 4/1972 | Caiola et al. .................... | 429/194 |
| 3,806,369 | 4/1974 | Dey et al. ....................... | 429/194 |
| 3,928,070 | 12/1975 | Gunther et al. .................. | 429/194 |
| 3,935,025 | 1/1976 | Cadman et al. .................. | 429/194 X |
| 3,985,574 | 10/1976 | Feuillade et al. ................ | 429/190 X |
| 3,997,362 | 12/1976 | Eustace et al. ................... | 429/194 |

*Primary Examiner*—Charles F. LeFevour
*Attorney, Agent, or Firm*—Sughrue, Rothwell, Mion, Zinn and Macpeak

[57] ABSTRACT

The invention relates to a lithium electric cell comprising, in a first embodiment, a lithium negative electrode and a positive electrode made in particular of copper sulphide, the electrolyte comprising a salt such as tetralkylammonium having predominantly anionic conductivity and, in a second embodiment, said cell comprises between the electrodes a separation membrane made of an anionic exchanger material such as quaternized polyvinylpyridine, the electrolyte of the cathode compartment being tetralkylammonium chloride, the electrolyte of the anode compartment being a salt such as lithium perchlorate having predominantly cationic conductivity. The invention is implemented in cells in thin layers.

24 Claims, 2 Drawing Figures

LITHIUM ELECTRIC CELL

The present invention relates to an electric cell having a lithium negative electrode. The electrolyte includes a non-aqueous solvent and the positive electrode is made of a material which, during discharge, releases an anion which is liable to react with lithium to form a compound which is insoluble in the electrolyte. Such materials include, for example the salts copper or silver chloride or sulphide and in particular copper sulphide.

Such cells are of a general economic interest due to their very high energy density (of the order of 700 Wh/dm$^3$), and embodiments have been described which use an electrolyte comprising lithium perchlorate immobilized in the form of a gell in a non-aqueous medium such as propylene carbonate.

Such cells have an advantageous "thin layer" structure.

The overall reaction leading to the generation of an e.m.f. is therefore:

$$2Li + 2CuS \rightarrow Li_2S + Cu_2S$$

Nevertheless it is observed that in such cells, the precipitate of Li$_2$S is produced preferentially at the positive electrode and causes a rapid passivation of this electrode, which results in an appreciable reduction of the performance of the cell.

The Applicant has therefore contrived in the context of the present invention to avoid such precipitation or better still to delocalize it (i.e. to promote the formation thereof within the electrolyte and hence outside the zone adjacent the positive electrode).

For this purpose the Applicant has observed as a result of systematic tests that it was sufficient to ensure ionic conductivity with anionic predominance within the electrolyte in order to avoid the above-mentioned disadvantage.

Such conductivity can be obtained either by using an electrolyte having a predetermined composition or by providing a separation membrane having a particular structure, (or by a combination of these techniques) as will be explained in detail in the description below.

The present invention provides an electric cell comprising a lithium negative electrode, an electrolyte including a non-aqueous solvent, and a positive electrode made of a material which, during discharge, releases an anion which is liable to react with lithium to form a compound which is insoluble in the electrolyte, wherein the electrolyte includes at least one salt of predominantly anionic conductivity dissolved in the non-aqueous solvent.

Preferably the said salt is a tetralkylammonium halide at a concentration of 0.1 to 1 mole per liter of the solvent.

In one embodiment the cell includes an anionic exchanger membrane dividing the electrolyte into a cathode compartment and an anode compartment. Preferred materials for this structure are:

- Anode compartment has an electrolyte including a salt having cationic conductivity (such as lithium perchlorate at a concentration of 10 to 100 gr per liter);
- Cathode compartment includes the electrolyte having anionic conductivity (such as tetralkylammonium halide or tetralkylammonium perchlorate at a concentration of 0.1 to 1 mole per liter); and
- Exchanger membrane is polyvinylpyridine quaternised by an alkylradical.

Figure 2:
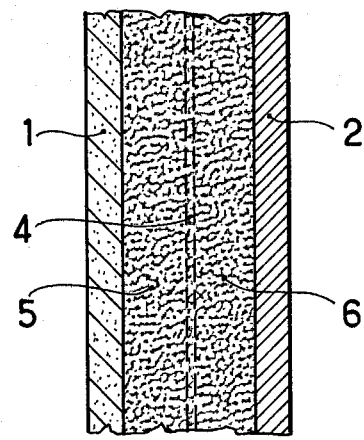

Two embodiments of the invention are described by way of example with reference to the accompanying drawing in which:

FIG. 1 is a schematic cross-section of a first embodiment of an electric cell embodying the invention; and FIG. 2 is a schematic cross-section of a second embodiment of an electric cell embodying the invention.

In FIG. 1, an electric cell embodying the invention comprises a lithium negative electrode 1, an electrolyte 3 and a positive electrode 2 made of a salt which, during discharge, is capable of releasing an anion which is liable to form a compound with lithium that is insoluble in the electrolyte. Said salt is for example copper sulphide CuS, but can also be copper chloride or silver chloride or even silver chromate.

The electrolyte 3, which may be gelled or immobilized in a non-aqueous solvent such as propylene carbonate, is disposed between the two electrodes.

Such components are in the form of thin layers whose thickness has purposely been exaggerated in the figures.

The conductivity of the electrolyte has anionic predominance and its anion reacts with lithium to form a salt which is insoluble in the electrolyte; advantageously, this electrolyte is a tetralkylammonium whose general formula is the following:

$$XNR_4$$

In this formula:

X represents the halide; and
R represents an alkyl radical in which the number of carbon atoms is of 2 to 6.

Preferably tetrabutyl ammonium chloride is used. Such a compound is advantageously gelled by mixing it with the required quantity of a gelling agent such as polyvinylic formal or polyvinylic butyral in a non-aqueous medium such as propylene carbonate.

By way of an example, the electrolyte will have a formula as follows:

Ammonium tetrabutyl chloride: 28 to 280 gr/liter
Propylene carbonate: 1 liter
Polyvinylic formal: 0 to 300 gr/liter As previously set forth the electrolyte thus implemented has predominantly anionic conductivity, thus promoting the migration of the S$_2$– ions towards the lithium electrode and the formation of the precipitate of Li$_2$S in the vicinity of this electrode, thus preventing the passivation of the positive electrode as mentioned previously.

With reference to FIG. 2, a second electric cell embodying the present invention comprises electrodes 1 and 2 such as previously described. But in this embodiment, a membrane 4 is disposed between these electrodes in the electrolyte 3 thus defining an anode compartment 5 and a cathode compartment 6.

This membrane 4 is made of an anionic exchanger material and in particular of polyvinylpyridine quaternized by an alkyl radical whose formula is as follows:

$$(CH_2-CH-C_5H_5NR)n^+$$

a formula in which R is the alkyl radical in which the number of carbon atoms is of the order of 2 to 6 and in particular 4.

Such a material can be either reticulated or non-reticulated and in all cases, it has good ionic conductivity in an organic medium as well as excellent resistance to various reagents.

Further, an electrolyte made of lithium perchlorate which is advantageously gelled in contact with propylene carbonate is disposed in the compartment 5, while an electrolyte made of a halide or of a tetralkylammonium such as described with reference to FIG. 1, also gelled in contact with propylene carbonate, is contained in the compartment 6.

Since lithium perchlorate has predominantly cationic conductivity and tetralkylammonium halide or perchlorate has predominantly anionic conductivity, it will be seen that the precipitate of $Li_2S$ will be formed exclusively at the membrane 4 and not at the electrodes.

By way of example, the formula of the electrode in the compartment 6 will be as set forth with reference to FIG. 1, while the formula of the electrolyte in the compartment 5 will be as follows:

Lithium perchlorate: 10 to 100 gr/liter
Propylene carbonate: 1 liter
Polyvinylic formal: 0 to 300 gr/liter The cells produced according to the invention make it possible to obtain a current density greater than 0.1 $mA/cm^2$ for an e.m.f. of 1.8 volts.

These cells are of the average-power miniaturized type, their discharge time being a few tens of hours.

Of course the invention is in no way limited to the embodiments described and illustrated, but on the contrary it covers all variants thereof that fall within the scope of the claims.

What we claim is:

1. An electric cell comprising a lithium negative electrode, electrolytes including a non-aqueous solvent, a positive electrode made of a material which, during discharge, releases an anion capable of reacting with lithium to form a compound which is insoluble in the electrolyte and a membrane of an anionic exchanger material interposed in the electrolyte between the electrodes thereby defining a cathode compartment and an anode compartment, containing different electrolytes wherein the electrolyte in the cathode compartment includes at least one salt of predominantly anionic conductivity dissolved in the non-aqueous solvent and the electrolyte in the anode compartment includes at least one salt of predominantly cationic conductivity dissolved in the non-aqueous solvent.

2. An electric cell according to claim 1, wherein the said at least one salt of predominantly anionic conductivity includes an alkyl radical.

3. An electric cell according to claim 2, wherein the said at least one salt is a tetralkylammonium halide.

4. An electric cell according to claim 3, wherein the tetralkylammonium halide is at a concentration of 0.1 to 1 mole per liter of the non-aqueous solvent.

5. An electric cell according to claim 2, wherein the, alkyl radical comprises two to six carbon atoms.

6. An electric cell according to claim 5, wherein the number of carbon atoms is four.

7. An electric cell according to claim 1, wherein the said at least one salt of predominantly anionic conductivity is restricted to the electrolyte of the cathode compartment.

8. An electric cell according to claim 7, wherein the anode compartment is filled with an electrolyte including a nonaqueous solvent and having at least one salt of predominantly cationic conductivity dissolved therein.

9. An electric cell according to claim 8, wherein the said at least one salt of predominantly cationic conductivity is lithium perchlorate.

10. An electric cell according to claim 9, wherein the lithium perchlorate is at a concentration of 10 to 100 gr per liter of the non-aqueous solution.

11. An electric cell according to claim 8 wherein the said salt of predominantly cationic conductivity includes an alkyl radical comprises 2 to 6 carbon atoms.

12. An electric cell according to claim 11 wherein the number of carbon atoms is 4.

13. An electric cell according to claim 1, wherein the said at least one salt of predominantly anionic conductivity is chosen from the group consisting of tetralkylammonium halide and tetralkylammonium perchlorate.

14. An electric cell according to claim 13, wherein the said at least one salt of predominantly anionic conductivity is at a concentration of 0.1 to 1 mole per liter of the nonaqueous solvent.

15. An electric cell according to claim 1 wherein the membrane includes an alkyl radical and is made of a reticulated material.

16. An electric cell according to claim 15, wherein the membrane is polyvinylpyridine quaternized by the alkyl radical.

17. An electric cell according to claim 1 wherein the membrane includes an alkyl radical and is made of a non-reticulated material.

18. An electric cell according to claim 1, wherein the non-aqueous solvent comprises propylene carbonate.

19. An electric cell according to claim 1, wherein the electrolytes are gelled.

20. An electric cell according to claim 19, wherein the electrolytes are gelled with polyvinylic formal or polyvinylic butyral.

21. An electric cell according to claim 1, wherein said material of the positive electrode is chosen from the group consisting of copper sulphide, silver sulphide, copper chloride, silver chloride and silver chromate.

22. The electric cell of claim 1 wherein said anion is chloride, sulphide or chromate.

23. An electric cell comprising a lithium negative electrode, an electrolyte including a non-aqueous solvent, and a positive electrode made of a material which, during discharge, releases an anion capable of reacting with lithium to form a compound which is insoluble in the electrolyte, a membrane being interposed between the electrodes and defining a cathode compartment and an anode compartment, wherein the membrane is made of an anionic exchanger material comprising polyvinylpyridine quaternized by an alkyl radical; the electrolyte in the anode compartment comprising lithium perchlorate in a concentration of 10 to 100 gr per liter of its non-aqueous solvent; and the electrolyte in the cathode compartment having predominantly anionic conductivity, is chosen from the group consisting of tetralkylammonium ad tetralkylammonium halide perchlorate at a concentration of 0.1 to 1 mole per liter of its non-aqueous solvent.

24. The electric cell of claim 23 wherein said anion is chloride, sulphide or chromate.

* * * * *